F. GOFF.
AIR BRAKE APPLIANCE.
APPLICATION FILED NOV. 11, 1916.

1,254,678.

Patented Jan. 29, 1918.
2 SHEETS—SHEET 2.

Witnesses

Frank Goff, Inventor by

Attorneys

UNITED STATES PATENT OFFICE.

FRANK GOFF, OF CAMDEN, NEW JERSEY.

AIR-BRAKE APPLIANCE.

1,254,678.  Specification of Letters Patent.  Patented Jan. 29, 1918.

Application filed November 11, 1916. Serial No. 130,856.

*To all whom it may concern:*

Be it known that I, FRANK GOFF, a citizen of the United States, residing at Camden, in the county of Camden and State of New Jersey, have invented a new and useful Air-Brake Appliance, of which the following is a specification.

The present invention appertains generally to air brakes for railroad locomotives and cars, street cars and other vehicles, and it is the object of the invention to provide an appliance applicable to the main and auxiliary reservoirs of the air brake system, and operable for applying the brakes in the event of a predetermined reduction of reservoir pressure, the device being entirely automatic in operation and serving to apply all of the brakes upon the predetermined dangerous reduction in reservoir pressure, whether it be due to leakage, failure of air, compressor, the opening or breaking off of the drain cock of the reservoir, or any other cause whatever.

It is the object of the invention to provide a simple and inexpensive appliance which can be readily applied to a main or auxiliary reservoir, and which is operable in a simple, yet effective manner for applying the brakes automatically in the event of an abnormal reduction in reservoir pressure, the present devices being used as attachments for the ordinary automatic air brake system without entailing prohibitive alterations or impairing the operation of the air brakes.

A further object of the invention is the provision of an air brake appliance of the nature indicated which is operable to automatically open the brake pipe to the atmosphere upon the predetermined reduction in reservoir pressure, the device operating in such a manner that after the brake pipe has been opened to the atmosphere and the brakes applied, the brake pipe is again closed, whereby the pressure in the reservoir can be increased as usual.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1:
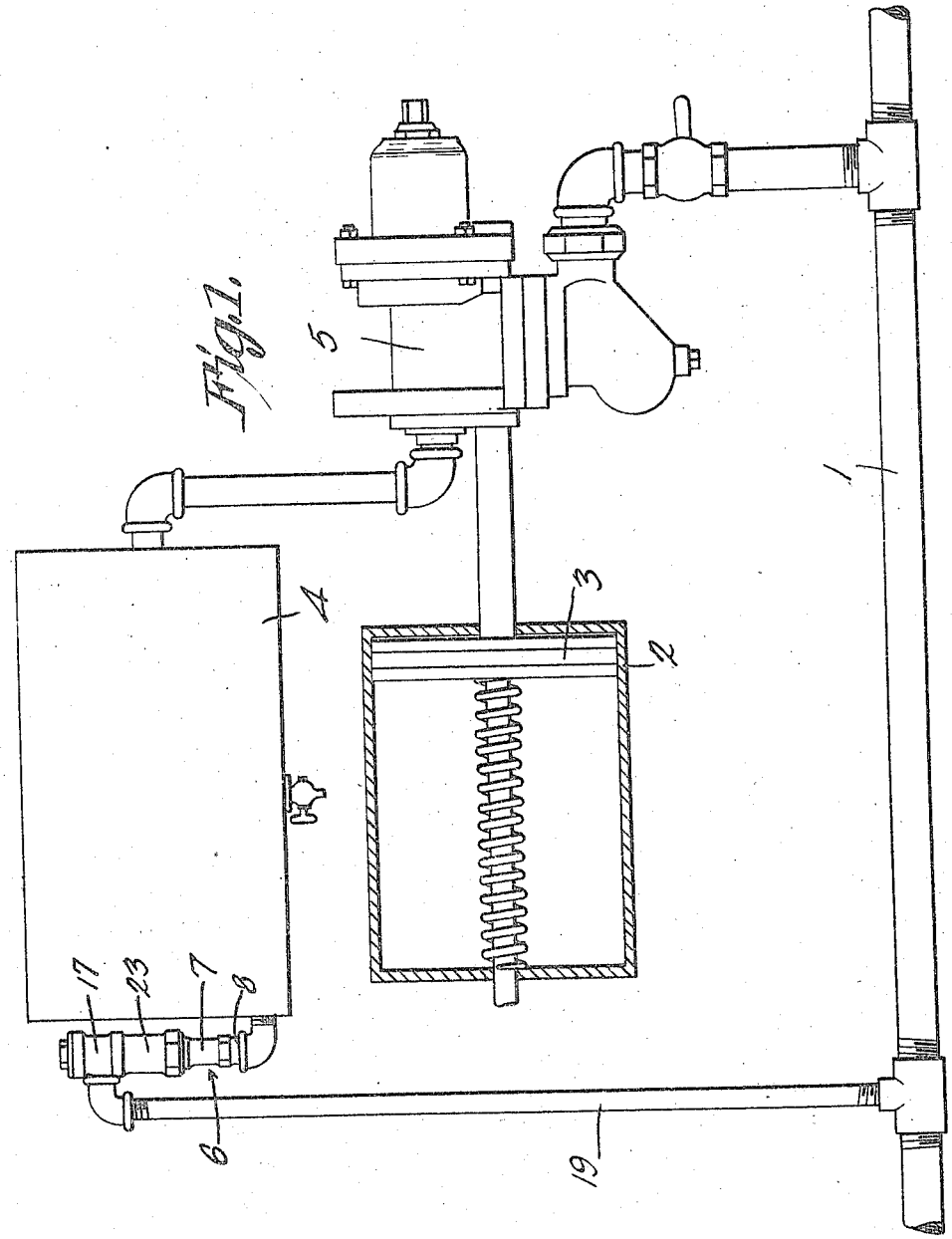
Figure 1 is an elevation of a part of the air brake equipment of a car illustrating the improved appliance applied thereto, the brake cylinder being shown in section.

In the drawings, the appliance is illustrated as being applied to an auxiliary reservoir, although it will be evident from the description that the improvements can be used in connection with the main reservoir as well. The numeral 1 designates the brake or train pipe, and the numeral 2 designates the brake cylinder in which the piston 3 works for applying and releasing the brakes. The auxiliary reservoir 4 as well as the brake cylinder 2 are connected to the triple valve 5 in the usual manner which is in turn connected to the brake pipe 1 for automatically establishing the flow of air from the reservoir 4 into the cylinder 2 upon the reduction in pressure in the brake pipe 1.

The present appliance is designated generally by the reference character 6, and includes a tubular member 7 having one end, designated 8, connected in any suitable manner, either directly or indirectly, to the reservoir 4. This member 7 is provided with a beveled seat or shoulder 9 facing toward the reservoir, and a bushing 10 is threadedly or otherwise engaged within the other end of the member 7, being held in place by a jam nut 11, if desired. A stem 12 is slidable through the bushing 10 and carries a head or piston 13 which is seatable against the seat or shoulder 9 when moving in a direction away from the reservoir under reservoir pressure. A packing cup 14 is secured to the head or piston 13 for preventing leakage, and the member 7 is provided with a vent aperture 15 between the bushing 10 and seat 9, whereby to permit any pressure fluid to escape to the atmosphere which may leak past the head 13 and seat 9, so that the pressure will not accumulate behind the head 13. A coiled wire expansion spring 16 surrounds the stem 12 within the member 7 and is confined between the bushing 10 and head 13, and tends to move said head 13 against the air pressure, in order that when the reservoir pressure is decreased a predetermined amount, the spring 16 asserts itself and moves the head 13 and stem 12.

In order to apply the brakes of the entire train when the stem 12 is moved under the influence of the spring 16, a valve casing 17 has a port 18 connected by a branch pipe 19 or any other suitable means with the brake pipe 1, the casing 17 having a cap 20 provided with an exhaust port 21 opening into the atmosphere. Said cap also has a valve seat 22. As a convenient means of supporting the valve casing 17, that portion thereof opposite the cap 20 is threadedly or otherwise connected with a tubular standard or support 23 threadedly or otherwise connected at its other end with that end of the member 7 having the bushing 10. A valve stem 24 is slidable through that wall or partition of the valve casing 17 adjacent to the member 23 and carries a suitable valve 25 seatable against the seat 22 to close the exhaust port 21, whereby to ordinarily prevent the flow of pressure fluid to the atmosphere. A weak coiled wire expansion spring 26 surrounds the stem 24 within the casing 17 and is confined between the valve 25 and wall of the casing 17 whereby to seat the valve 25 when it is free to do so. The stem 24 carries a frusto-conical head or collar 27 at that end remote from the valve 25 and located within the member 23.

Figure 2:
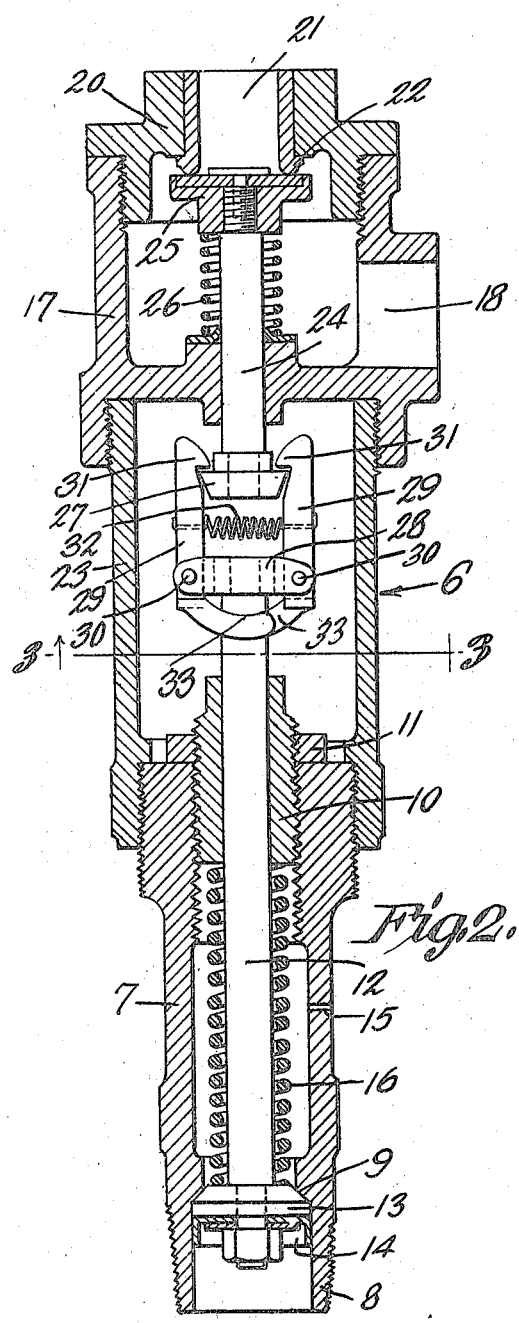
Fig. 2 is an enlarged longitudinal section of the appliance, portions being shown in elevation.
Figure 3:
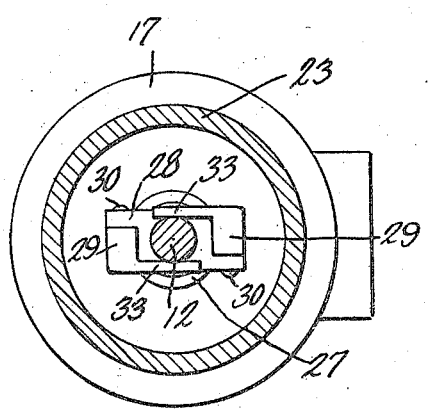
Fig. 3 is a cross section on the line 3—3 of Fig. 2.
Figure 4:
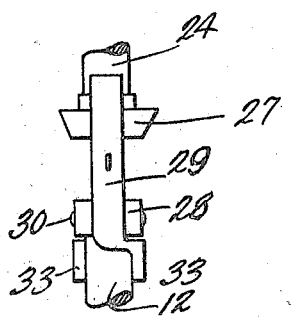
Fig. 4 is a fragmental side elevation of the clutch device.

The stem 12 carries a clutch at that end within the member 23 for engaging the head 27, and for this purpose, a transverse member 28 is secured in any suitable manner to the end of the stem 12 and a pair of catches 29 projecting toward the valve casing 17 are pivoted, as at 30, to the member 28 at opposite sides, and are provided with cam lugs 31 to snap over the upper larger diametered surface of the head 27, as seen in Fig. 2. A coiled wire retractile spring 32 connects the catches 29 for swinging them toward one another. The catches 29 are provided at their pivoted ends opposite to their free ends or hooks 31, with curved arms 33 offset to extend transversely across the stem 12 at opposite sides. These arms 33 are adapted to seat against the bushing 10 or other stop when the stem 12 is moved under the influence of the spring 16 a certain amount.

In operation, when the reservoir pressure is above a predetermined amount, the head or piston 13 is moved against the seat or shoulder 9, compressing the spring 16, so that the catches 29 snap into engagement with the head 27, the valve 25 being seated. The brakes can therefore be applied by reducing the pressure in the brake pipe as usual, and the reservoir pressure may vary above the predetermined amount, without bringing the present appliance into operation. However, should the reservoir pressure be reduced below the predetermined amount for any cause whatever, the spring 16 in asserting itself, will move the head 13 and stem 12 against the reduced reservoir pressure, and the catches 29 being moved with the stem 12 will carry the head 27 and stem 24 with them, thereby unseating the valve 25 and permitting the pressure fluid to escape from the brake pipe to the atmosphere, which will apply the brakes of all the cars, including the locomotive. When the stem 12 is moved to bring the arms 33 against the bushing or stop 10, said arms are stopped in their movement, and the further movement of the stem 12 moves the member 28 toward the arms 33, and this will swing the catches 29 away from one another, thereby releasing the head 27, in which event the spring 26 will immediately throw the valve 25 to closed position. Sufficient time has elapsed, however, for the reduction in pressure in the brake pipe, to apply the valves. The port 21 which was opened by the opening of the valve 25, is now again closed, so that the pressure in the brake pipe and reservoirs can be increased. As the pressure in the reservoir is increased, the head 13 and stem 12 are moved back to original position, and when the head 13 is returned against the shoulder or seat 9, the catches 29 snap into engagement with the head 27. It will be noted that when the stem 12 is moved to remove the arms 33 from the bushing 10, the spring 32 will swing the catches 29 toward one another, but they will be separated by the cam action of the lugs 31 against the sides of the head 27, so that the lugs or hooks 31 will move over the head 27 as seen in Fig. 2, to again pull the valve 25 with the stem 12 in the event of subsequent excessive reduction in reservoir pressure.

Having thus described the invention, what is claimed as new is:—

1. An air brake appliance embodying means moved to one position by reservoir pressure and movable to another position upon a predetermined reduction in reservoir pressure, means movable from one position to another for effecting an application of the brakes, and means for moving the second mentioned means with the first mentioned means upon the predetermined reduction in reservoir pressure for effecting an application of the brakes and then automatically releasing the second mentioned means when the first mentioned means has moved a certain distance.

2. An air brake appliance embodying means moved to one position by reservoir pressure, spring means tending to move said means against reservoir pressure to move said means upon a predetermined reduction in reservoir pressure, means movable from one position to another for effecting an application of the brakes, spring means for moving the third mentioned means to first mentioned position, and means for moving the third mentioned means with the first mentioned means under the influence of the first mentioned spring means and then automatically releasing it when the first mentioned means has moved a certain distance.

3. An air brake appliance embodying a normally closed valve for permitting the flow of pressure fluid to the atmosphere from a brake pipe when the valve is opened, means moved to one position by reservoir pressure, means tending to move said means against reservoir pressure for moving said means upon the predetermined reduction in reservoir pressure, and means for moving the valve to open position when the first mentioned means is moved against reservoir pressure and then automatically releasing the valve when the first mentioned means has moved a certain amount.

4. An air brake appliance embodying means moved to one position by reservoir pressure and movable to another position upon the predetermined reduction of reservoir pressure, means movable from one position to another for effecting an application of the brakes and returned to first mentioned position when released, and a clutch for moving the second mentioned means with the first mentioned means when the pressure is reduced for applying the brakes and operable for releasing the second mentioned means after the first mentioned means has moved a certain amount.

5. An air brake appliance embodying a member moved to one position by reservoir pressure, means tending to move said member to another position for moving said member to second mentioned position upon a predetermined reduction in reservoir pressure, a valve movable to open position for opening a brake pipe to the atmosphere, said valve closing when released and having a stem, and a clutch for connecting said member and stem to move said stem with said member and against reduced reservoir pressure, said clutch being operable to release the valve when said member has moved a certain amount.

6. An air brake appliance embodying a member moved to one position by reservoir pressure and movable to another position upon a predetermined reduction in reservoir pressure, a stem normally in one position and movable to another position for effecting an application of the brakes, a catch carried by said member and engageable with said stem for moving said stem with said member upon a predetermined reduction in reservoir pressure, and means for releasing said catch after said member has moved a certain amount.

7. An air brake appliance embodying a member adapted to be connected with a reservoir, a spring pressed member working therein to be moved to one position by reservoir pressure and movable to another position upon a predetermined reduction in reservoir pressure, a valve casing connected to the first mentioned member and having a port for connection with a brake pipe and an exhaust port, a valve for closing the exhaust port and having a stem projecting out of the valve casing, said stem having a head, a pair of spring pressed catches pivotally connected with the second mentioned member and having hooks engageable with said head to pull said stem with the second mentioned member when moved against reduced reservoir pressure, said catches having opposite arms extending transversely of the second mentioned member at opposite sides thereof, and a stop in the path of said arms when the second mentioned member is moved whereby to separate the catches and release said head.

In testimony that I claim the foregoing as my own, I have hereto affixed my signature in the presence of two witnesses.

FRANK GOFF.

Witnesses:
 Ivy E. Simpson,
 P. A. Rockelli.

Copies of this patent may be obtained for five cents each, by addressing the "Commissioner of Patents, Washington, D. C."